(12) United States Patent
Cheung

(10) Patent No.: US 7,870,135 B1
(45) Date of Patent: Jan. 11, 2011

(54) SYSTEM AND METHOD FOR PROVIDING TAG FEEDBACK

(75) Inventor: Kevin R. Cheung, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 315 days.

(21) Appl. No.: 11/480,307

(22) Filed: Jun. 30, 2006

(51) Int. Cl.
G06F 7/00 (2006.01)
G06F 17/30 (2006.01)

(52) U.S. Cl. .......................................... 707/737
(58) Field of Classification Search ................ 707/737
See application file for complete search history.

(56) References Cited

U.S. PATENT DOCUMENTS

| | | | |
|---|---|---|---|
| 6,618,697 B1 * | 9/2003 | Kantrowitz et al. | 703/22 |
| 7,668,821 B1 * | 2/2010 | Donsbach et al. | 705/27 |
| 7,676,449 B2 * | 3/2010 | Baio et al. | 707/781 |
| 2005/0043939 A1 * | 2/2005 | Trower et al. | 704/8 |
| 2005/0273724 A1 * | 12/2005 | Joeressen et al. | 715/773 |
| 2005/0289124 A1 * | 12/2005 | Kaiser et al. | 707/3 |
| 2006/0206454 A1 * | 9/2006 | Forstall et al. | 707/3 |
| 2007/0028171 A1 * | 2/2007 | MacLaurin | 715/705 |
| 2007/0078832 A1 * | 4/2007 | Ott et al. | 707/3 |
| 2007/0174247 A1 * | 7/2007 | Xu et al. | 707/3 |
| 2007/0239761 A1 * | 10/2007 | Baio et al. | 707/102 |
| 2008/0021898 A1 * | 1/2008 | Hoglund | 707/6 |

* cited by examiner

Primary Examiner—Luke S. Wassum
Assistant Examiner—Nicholas E Allen
(74) Attorney, Agent, or Firm—Lee & Hayes, PLLC

(57) ABSTRACT

A computer-implemented system for providing feedback to a user tagging an item includes a database and tag logic. The database is configured to store information associated with tags assigned to items. The tag logic is configured to receive one or more inputs from the user. The tag logic provides feedback to the user based on the input(s). The tag logic is also configured to assign a tag received from the user to the item, and store the tag in the database.

35 Claims, 6 Drawing Sheets

SYSTEM AND METHOD FOR PROVIDING TAG FEEDBACK

BACKGROUND

Network systems such as the Internet provide users with access to large amounts of information. In order to allow network users to find and organize information on network systems that is relevant to specific subject matter topics, various techniques have been developed. One such technique involves the use of "tags" and network-based tag services.

A tag may be a word or group of words that may be assigned to one or more items (e.g., files, documents, web pages on the Internet, items displayed via a web-based retail store, digital photographs displayed via a network, bookmarks, etc.). Tags may be used by users of a network system to, among other things, classify items, for example, by tagging a group of photographs with the tag "snow," and search for items, for example, by searching for photographs related to winter, using a tag-based search, and entering the tag "winter." Often, a single tag may be assigned to multiple items, and a single item may be associated with multiple tags.

A tag service may be presented within a variety of environments (e.g., as a part of a web-based retail operation offering shoppers the ability to tag specific items). The items being tagged may be provided by the network system, or by users of the network system, or by another entity. Typically, tags to be assigned to the item or items are chosen by users of the network system.

Upon tagging an item, certain information may be made available to other users of the tag service (e.g., users are often able to view all items having a common tag, regardless of what user assigned the tag to the individual items). This may be a particularly useful feature when, for example, conducting web-based searches, because tag-based searches generally generate results already deemed somehow relevant (i.e., "tagged") by other users.

However, because tag services depend on users to assign tags to items, there exists the potential that different users will use different tags that mean essentially the same thing or represent essentially identical subject matter. For example, two users shopping at a web-based retail store may each wish to tag a cellular phone. One user may assign the item the tag "phone," while the other may subsequently assign the item the tag "cell phone." As a result, subsequent tag-based searches using one of the two terms may not capture items tagged with the other term.

It would therefore be desirable to have a system that facilitates the development of a unified, or normalized, set of tags as more users utilize tagging systems. Other features and advantages will be made apparent from the present specification. The teachings disclosed extend to those embodiments that fall within the scope of the appended claims, regardless of whether they satisfy one or more of the above-identified needs.

SUMMARY

One embodiment of the invention relates to a computer-implemented system for providing feedback to a user tagging an item. The system may include a database for storing tags and information related to specific tags. The system provides feedback, e.g., in the form of one or more normalized tags, to users tagging one or more items. The system may present alternate tags based on the item chosen to be tagged, the relation of the alternate tags to the initial tag entered by the user, or another suitable method.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION

Figure 1:
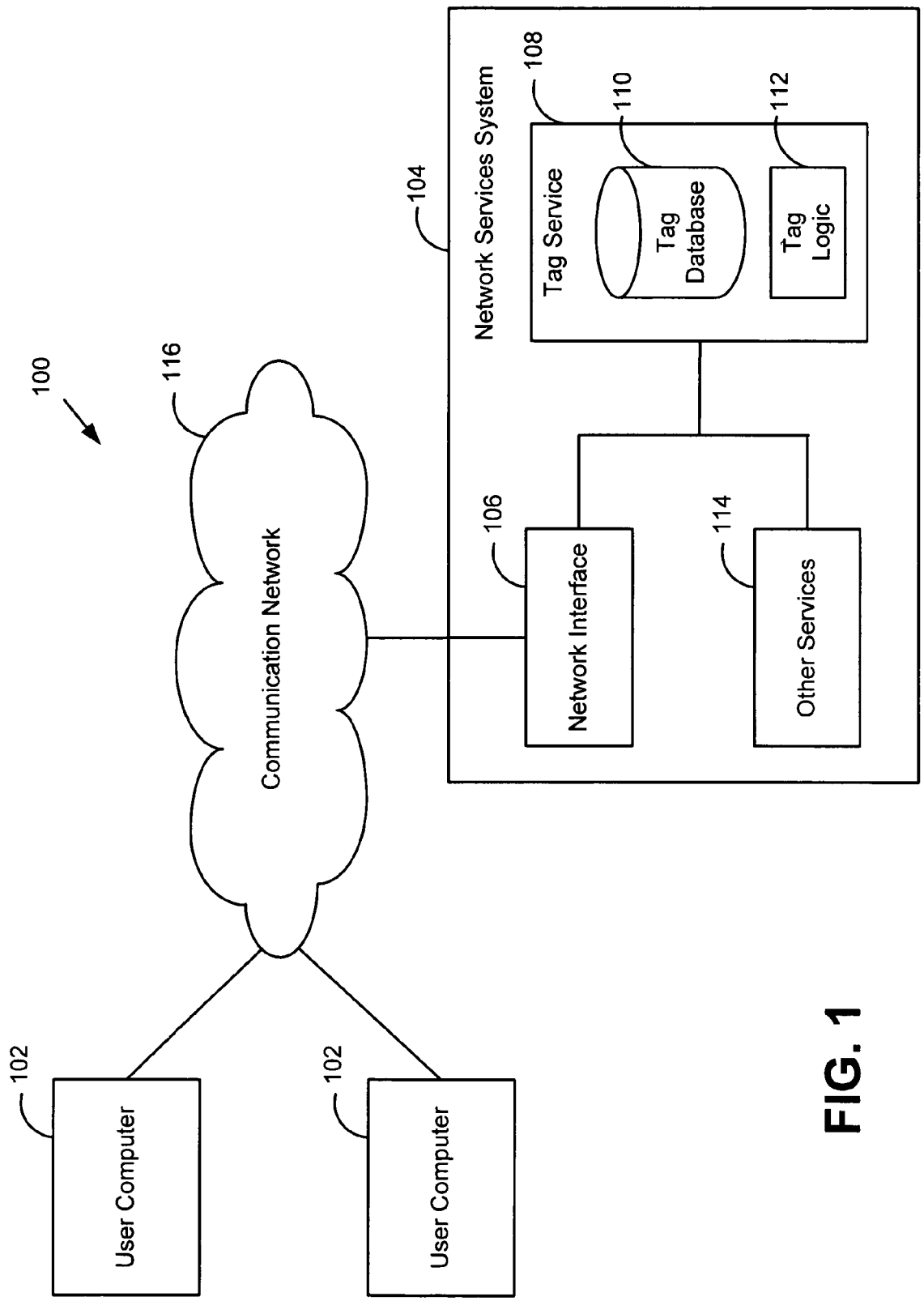
FIG. 1 is a schematic of a tag service according to one embodiment.

Referring to FIG. 1, a system 100 according to one embodiment is shown. System 100 includes one or more user computers 102 connected to network interface 106 by way of a communication network 116, such as the Internet. A network services system 104 may include network interface 106, tag service 108, and other services 114 (e.g., an automated checkout service for a network-based retailer).

Users are able to access network services system 104 and tag service 108 via user computers 102 and communication network 116. Tag service 108 may be provided to users in a variety of environments. For example, a network interface such as a web page may be intended primarily to allow users to "tag" other web pages, and categorize and search web pages according to the tags assigned to web pages by the user and other users. Alternatively, a web page may be used as a display for a web-based retail store, where tags may be provided as a part of the retailer's overall business intended to make the shopper's experience easier and more enjoyable. Tags may be assigned to various types of items, including retail merchandise, newspaper articles, photographs, etc. In other embodiments, tags may be assigned by tag service 108 to groups of items, grouping categories, or levels of items.

Figure 2:
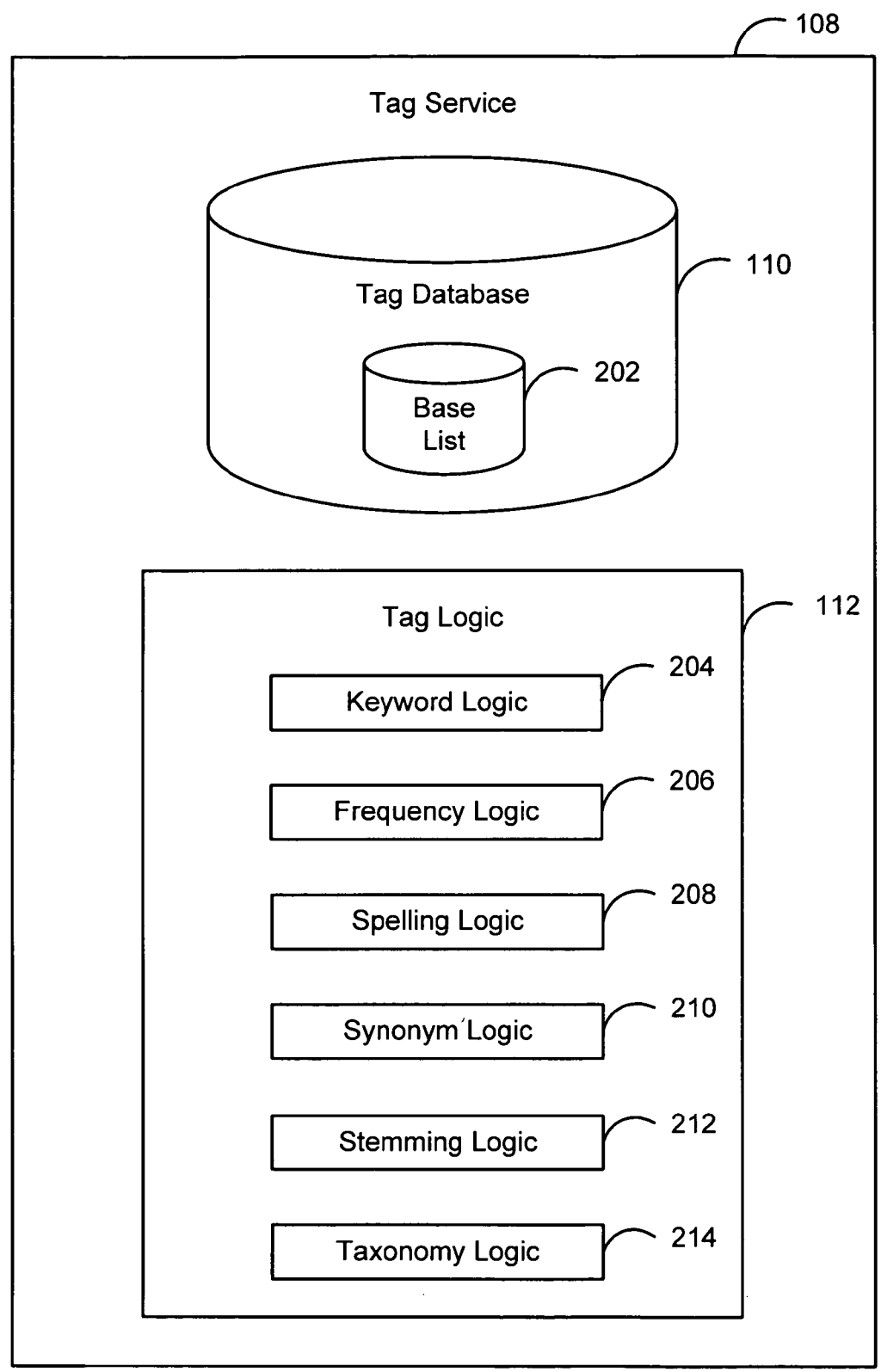
FIG. 2 is a schematic of the tag service of FIG. 1 shown in further detail according to one embodiment.

Referring to FIG. 2, tag service 108 is shown in greater detail. Tag service 108 includes tag database 110 and tag logic 112. Tag database 110 stores, or includes information associated with the tags assigned by users of tag service 108. Tag logic 112 is used to process information received from users of tag service 108 and to provide feedback concerning tags being entered by users.

Database 110 may include a list of (e.g., a set of one or more) tags assigned to one or more items using tag service 108. In addition to the name of the tag and the item or items to which the tag is assigned, database 110 may store or include other information for each tag. According to one embodiment, tag database 110 includes information related to the usage of tags on both a per item basis (e.g., how many times a tag has been assigned to a particular item) and aggregate basis (e.g., how many total times the tag has been used). According to another embodiment, tag database 110 may include user information (e.g., what user assigned the tag(s)), date information (e.g., when was the tag assigned to the item(s)), performance metrics information (e.g., how often the tag is clicked on by users), and so on.

According to one embodiment, tag database 110 includes base list 202. Base list 202 may include a set of normalized tags generated or derived by tag logic 112 from information stored in database 110 and the item or items being tagged. According to one embodiment, a normalized tag generally represents a subject matter area. A normalized tag may be based on an item being tagged, tags already assigned to an item, and/or other information, and is provided to a user tagging an item to encourage the use of a consistent and unified (e.g., "standardized") overall set of tags. Base list 202 is used by tag logic 112 to provide users with feedback (e.g., normalized tag suggestions) as users tag items using tag service 108. For example, if database 110 contains the tags "dog," "doggy," and "dogs," tag logic 112 may generate the normalized tag "dog" to be stored in base list 202 (i.e., "dog" representing the normalized form of each of the terms "dog," "doggy," and "dogs").

According to one embodiment, base list 202 is a list of normalized tags, where the normalized tags are generated by tag logic 112, and each normalized tag is assigned to one or more items. According to another embodiment, the normalized tags contained in base list 202 change over time as tags are used more or less frequently, as new items are added to be tagged and new key words are identified, etc. Tag logic 112 periodically analyzes the information stored in database 110 and the information received from users of tag service 108 and updates (e.g., adds normalized tags to or removes normalized tags from) base list 202 accordingly.

One purpose of generating/updating such a base list, as described in further detail below, is to be able to suggest one or more normalized tags to users as they tag new or existing items, and steer users away from the use of similar, but different, tags that mean essentially the same thing. For example, using the immediately preceding example, a user tagging an item related to dogs may have entered "dogs" or "doggy." By suggesting a normalized tag such as "dog" to the user, the number of duplicate or redundant tags is potentially reduced (e.g., in this case, if the user accepts the suggestion of using the normalized tag "dog," the number of different tags may be reduced from three to two), making searching and categorizing using the tags more effective and comprehensive, and at the same time preserving the opportunity for users to enter a new tag, if they so desire.

Various techniques may be used to generate and update the normalized tags stored in base list 202. The specific technique or techniques used may depend on the subject matter or type of item being tagged and the environment in which tag service 108 is being used. As shown in FIG. 2, tag logic 112 includes various types of logic that may be used to generate base list 202, including keyword logic 204 and frequency logic 206. Other types of logic may also be used to generate normalized tags.

Base list 202 may be generated/updated on the basis of all of the tags stored in tag database 110, or on a per-item basis, where tags are related to specific items (e.g., by being assigned to the item or being identified as a keyword for the item). According to one embodiment, tags may be associated with items by keyword logic 204. The keywords may be related to the subject matter of the item. For example, in the case of a book, keyword logic 204 may choose keywords on the basis of the subject matter of the book. The keywords may also be related to text characters contained in the item to be tagged. For example, in the case of web pages, keyword logic 204 may scan the text of the web pages for key words. Other ways of associating key words with items to be tagged may also be used.

According to one embodiment, normalized tags may be generated/updated by frequency logic 206. Frequency logic 206 may analyze the frequency of use of the tags stored in tag database 110. For example, upon reaching a certain usage threshold, frequency logic 206 may add a tag to base list 202. Conversely, a tag may be removed from base list 202 (yet still stored in database 110) by frequency logic 206 after a period of infrequent or non-use of the tag. Frequency logic 206 may be applied to all of the tags stored in database 110, or alternatively, may be applied to tags on a per-item basis (e.g., considering only tags that are related to a specific item).

In addition to keyword logic 204 and frequency logic 206, tag logic 112 may include additional types of logic that may be used to generate feedback to a user tagging an item and/or to generate base list 202. As shown in FIG. 2, tag logic 112 may include spelling logic 208, synonym logic 210, stemming logic 212, and taxonomy logic 214.

According to one embodiment, feedback may be generated by spelling logic 208. Spelling logic 208 may correct spelling errors contained in the tag information provided by the various users of tag service 108. For example, a user may enter the tag "motther," a misspelling of the word "mother." Spelling logic 208 recognizes the misspelling and generates "mother" as feedback. Spelling logic 208 may make corrections automatically, or only in response to confirmation from a user. According to another embodiment, an indication (e.g., highlighting, underlining, etc.) is provided to the user that one or more portions of text contains a spelling error, and one or more corrections may be displayed. Alternatively, a prompt (e.g., "Did you mean:") may be provided to the user, followed by one or more possible corrections from which the user may choose. Spelling logic 208 may make similar corrections and/or modifications to tags containing punctuation, punctuation errors, etc. Spelling logic 208 may also be used to generate base list 202. For example, if multiple tags for an item have spelling errors, spelling logic 208 may generate one or more corrected versions of the misspelled tag to be included in base list 202. Spelling logic 208 also avoids the proliferation of tags with misspelled words (and therefore tags which are unlikely to be commonly used) by propagating users toward the correct spellings of those words.

According to another embodiment, feedback may be generated by synonym logic 210. Synonym logic 210 may detect and eliminate synonyms related to user inputs in generating feedback. For example, if database 110 contains tags such as "canine" and "dog," synonym logic 210 may choose one of the more commonly-used synonyms (e.g., "dog") as feedback where the user has chosen a less common word (e.g., "canine"). Synonym logic may also take into account slang terms whose popularity and meaning may vary with time. For example, a slang term may be considered generally synonymous with different words as time passes. Similarly, the slang term(s) that are commonly used in place of a single, more "traditional" term may change over time. For example, a pair of dress pants may be referred to in a slang sense as either "trousers" or "slacks," with one of the terms being the predominant term currently in use. Synonym logic may use such information to suggest alternative tag options according to the temporal nature of the meaning of these words. Synonym logic 210 may also be used similarly to spelling logic 208 to generate base list 202, e.g., by propagating users to more commonly-used words, which may then be entered in base list 202.

According to another embodiment, feedback may be generated by stemming logic 212. Stemming logic 212 uses stemming techniques to generate feedback. Stemming techniques generally involve reducing one or more variants of a word down to a common base, or root, form of the word. For example, if a user enters the tag "birthdays," stemming logic 212 may generate feedback in the form of tags such as "birthday." Stemming logic 212 may also be used similarly to spelling logic 208 to generate base list 202 by reducing the number of variant words used by users to refer to the same concept.

According to another embodiment, feedback may be generated by taxonomy logic 214. Taxonomy logic 214 may use a taxonomy, or classification system, to organize normalized tags (e.g., the tags stored in base list 202). According to one embodiment, the tags stored in database 110 may be categorized using a subject matter taxonomy and organized according to a hierarchical tree model. The different levels of the taxonomy represent different levels of specificity with respect to various subject matters. For example, a given tag may be classified as a subcategory of a different tag, and may in turn have its own subcategories of tags. Taxonomy logic 214 may use such a taxonomy to suggest to a user tags of greater or lesser specificity than a tag entered by the user. For example, upon a user tagging a book related to dalmatians with the tag "dogs," taxonomy logic 214 may recognize that the user may instead prefer a more specific tag, and taxonomy logic may suggest a tag such as "dalmatians." The specific taxonomy system used may be constructed in a variety of ways, including references to the items being tagged and related subject matter categories. Further, the taxonomy system may be manually constructed or constructed based on existing taxonomy systems.

The various embodiments discussed herein with respect to generating and/or updating base list 202 and providing feedback to users may be implemented either individually or in combination, and may be utilized simultaneously or in succession. Various other methods of generating normalized tags and user feedback may additionally be used. According to various embodiments, feedback (e.g., normalized tags) are provided to users in response to one or more inputs from a user (e.g., a portion of text entered into a tag text box). As discussed in further detail with respect to FIGS. 3-7, base list 202 may be used to provide feedback to users as users tag items using tag service 108.

Figure 3:
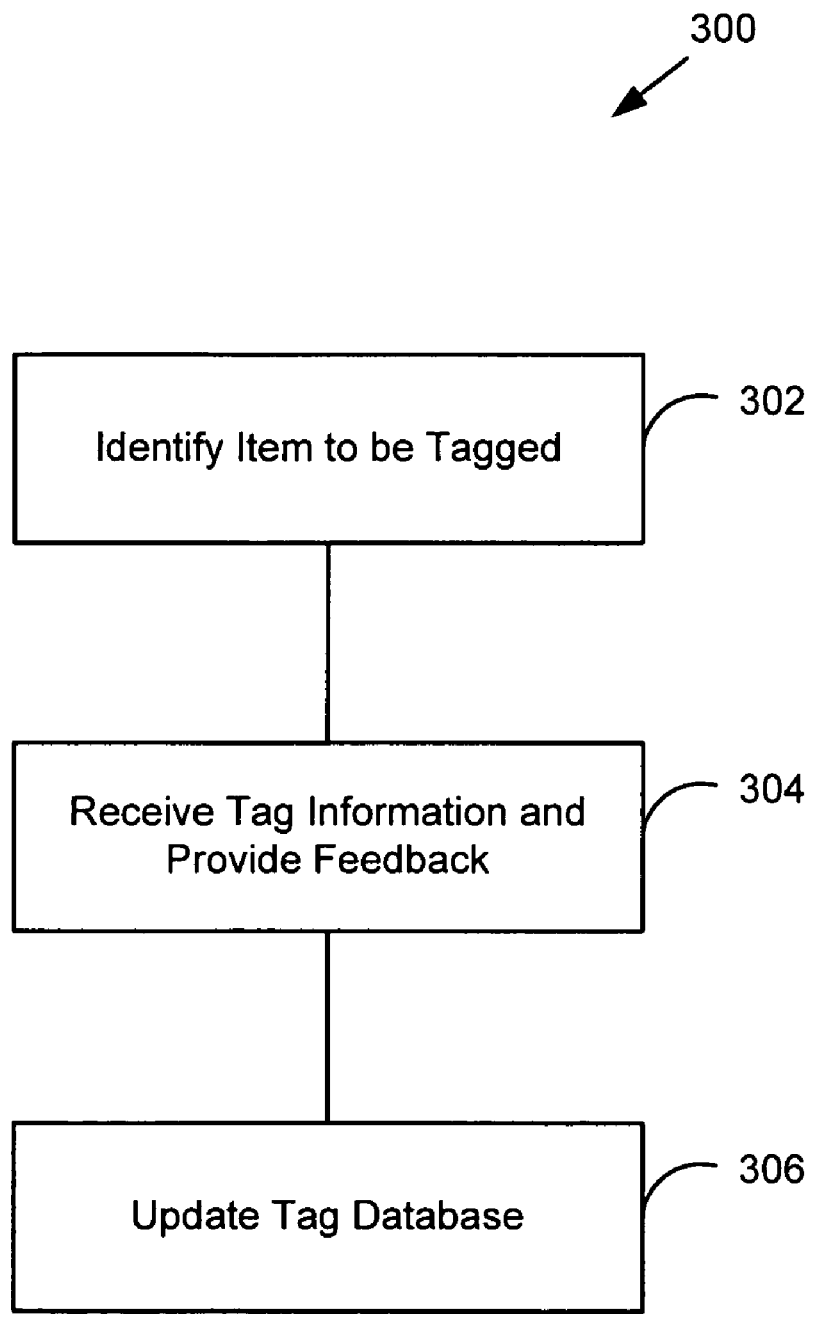
FIG. 3 is a flowchart illustrating the process of providing feedback to a user tagging an item according to one embodiment.

Referring to FIG. 3, a flowchart 300 showing a process of providing a user with feedback as the user enters tag information is shown. The feedback may include one or more normalized tags generated using, among other things, the information stored in tag database 110 (including base list 202) and the information provided by the various users.

At step 302, the item to be tagged is identified. The item may be provided by the network system, the user, or another entity. For example, in the case of a web-based retailer, items that may be tagged are provided to (e.g., displayed to) the user by the retailer as the user browses among the various displays provided by the retailer. In such a case, identifying the item to be tagged may consist of simply viewing the display page containing the item. Alternatively, in the case of a content-sharing (e.g., a photo-sharing) web page intended to allow users to view and tag content (e.g., digital photographs) posted on the web page by the user and/or others, the items to be tagged may be provided by the user.

At step 304, tag service 108 receives the tag information from the user and provides feedback to the user. Upon the user identifying the item to be tagged, tag service 108 may prompt the user to input a tag to be assigned to the particular item (see, for example, text box 404 shown in FIG. 4). According to one embodiment, in response to the user identifying the item to be tagged, the user may be provided with feedback prior to entering any text of a tag (e.g., by providing a normalized tag from base list 202 that is associated with the item, etc.). According to another embodiment, the tag information is a word or a group of words, and the user types the text of a tag into a text box provided to the user by tag service 108. Other means for entering tag information may alternatively be provided to a user (e.g., the tag could be graphic, audible, or other non-textual information). In response to the user input, tag service 108 provides feedback to the user, such as one or more normalized tags that the user may select to assign to the item. Sample methods of providing feedback to a user are discussed in more detail with respect to FIGS. 4-6.

At step 306, tag logic 112 assigns the tag to the item and updates tag database 110 in response to the tag information received from the user, including storing the name of the tag and the item to which the tag has been assigned. Upon properly updating tag database 110, the process shown in FIG. 3 may be repeated with either the same or a different item (e.g., the user may choose to assign an additional tag or tags to the same item, or to tag a new item).

Figure 4:
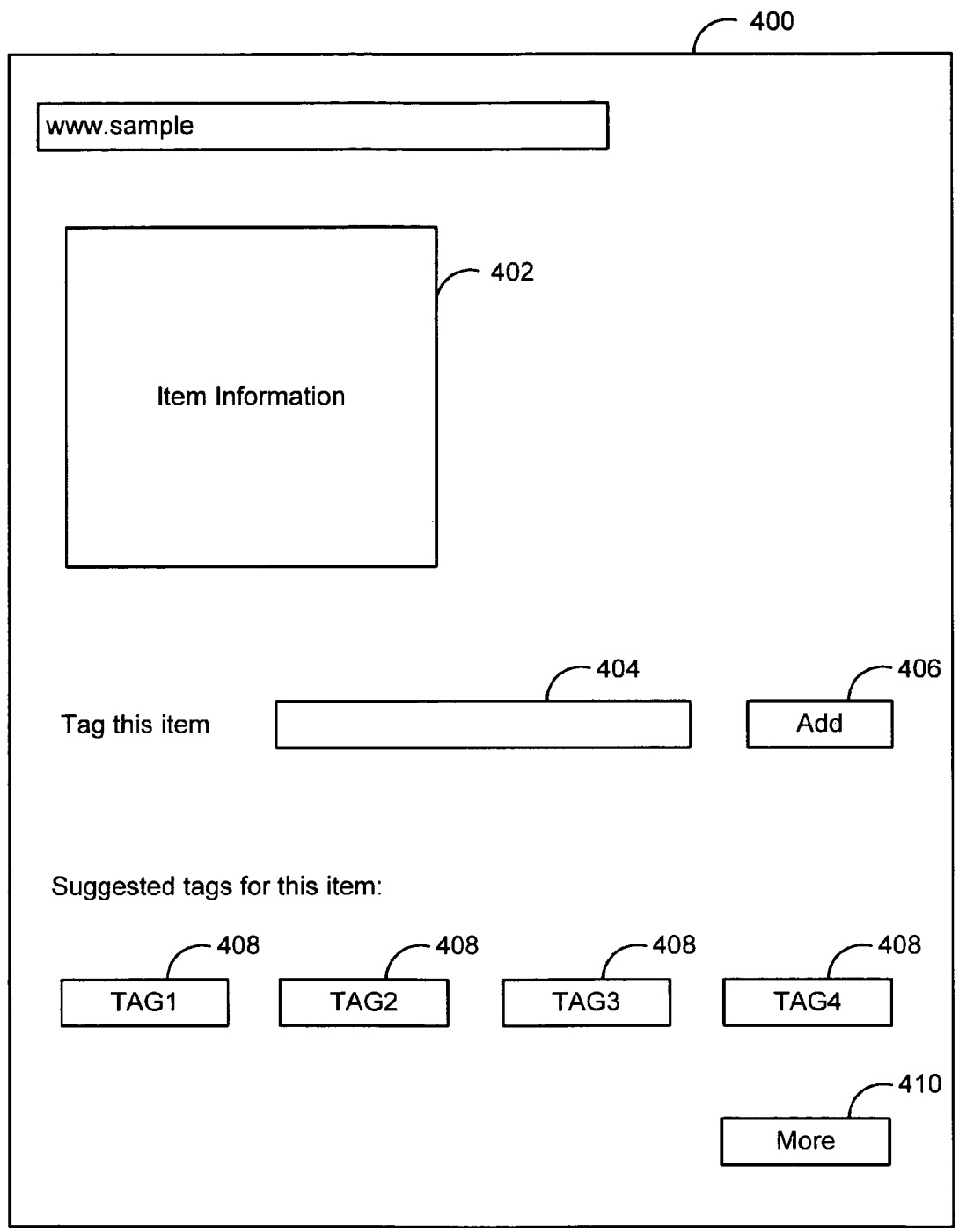
FIG. 4 is a screenshot of a web page for providing tag options to a user tagging an item according to one embodiment.
Figure 5:
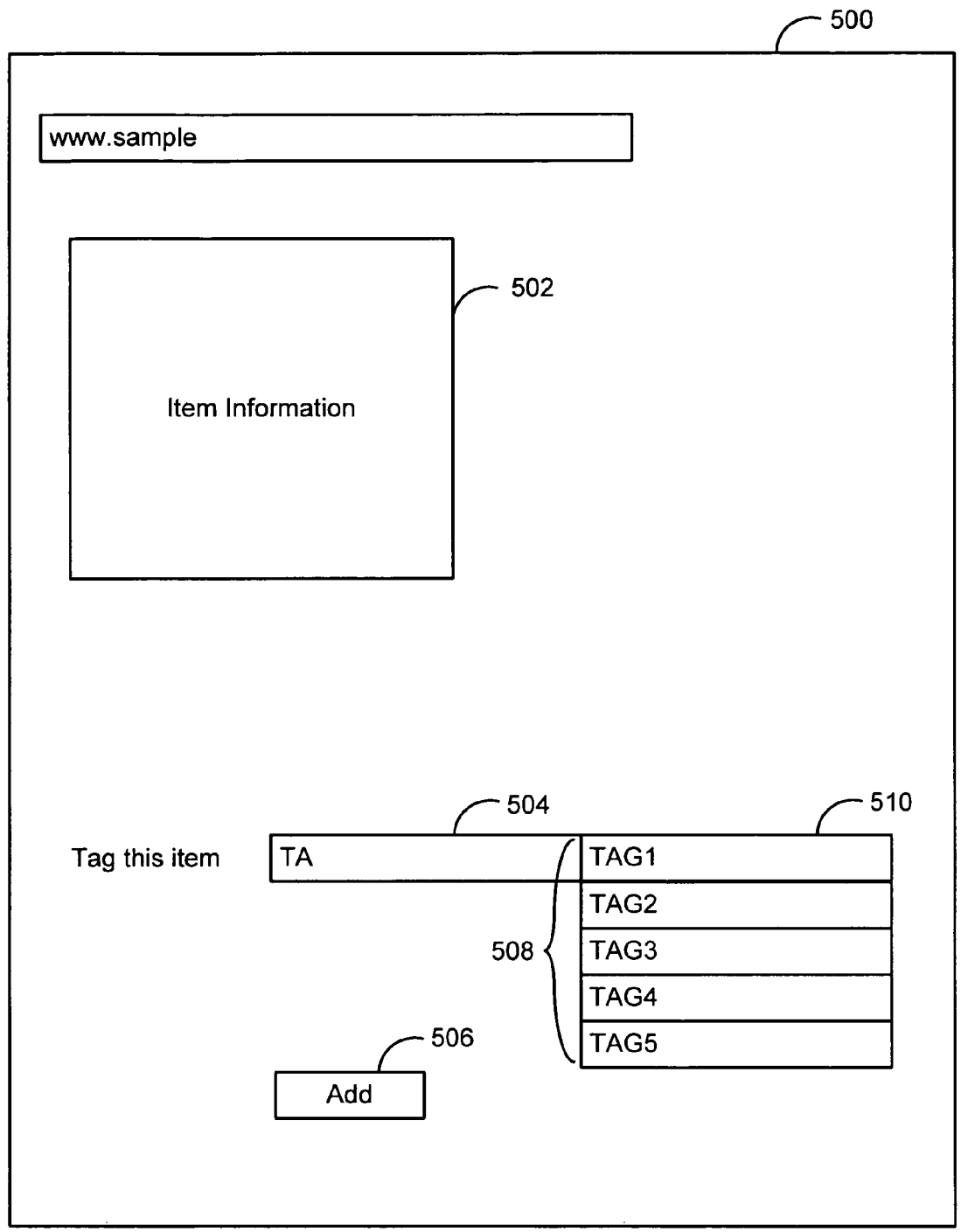
FIG. 5 is a screenshot of a web page for providing feedback to a user tagging an item according to one embodiment.
Figure 6:
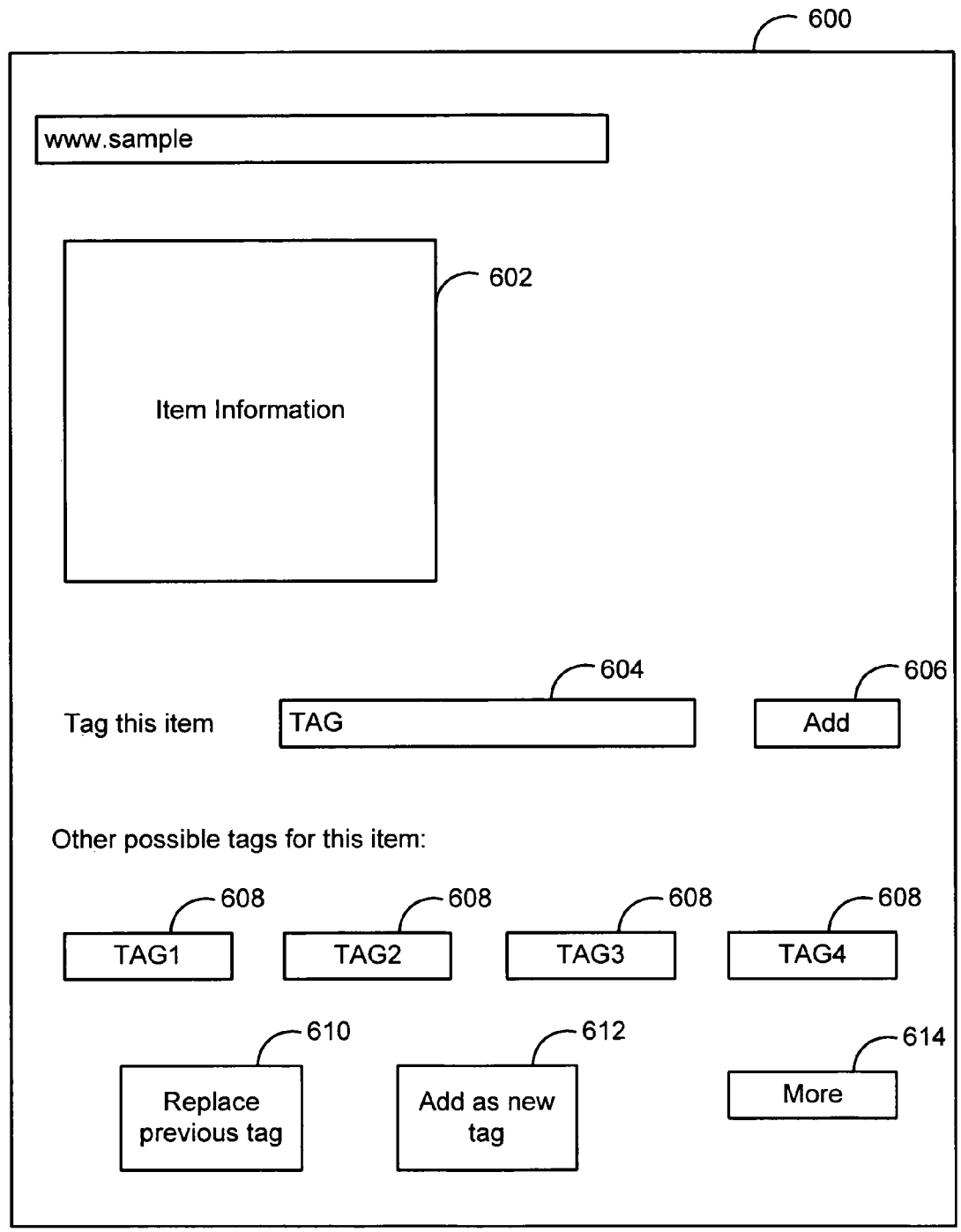
FIG. 6 is a screenshot of a web page for providing feedback to a user tagging an item according to one embodiment.

Referring now to FIGS. 4-6, embodiments of providing tag options or feedback to a user tagging an item are shown. Upon identifying the item to be tagged, tag service 108 may employ one or more of the below methods of providing feedback (e.g., one or more normalized tags) to a user.

Referring to FIG. 4, display 400 shows one embodiment of displaying tag options to a user. Display 400 includes item information 402, text box 404, add option 406, and suggested tag options 408. Item information 402 may include various types of text, graphics, and/or other content describing, or related to, the item being tagged, such as a digital photograph, a uniform resource indicator (URI) for a web page, pricing, delivery and/or other information for a retail item offered for sale on a network-based retail store, etc. Users enter tag information for the item into text box 404 in response to the "Tag this item" prompt. Upon entering the information, a user may select add option 406 ("Add"). Other ways of configuring display 400 and receiving inputs from a user may alternatively be used.

The information provided to a user in response to the user selecting a particular item is shown in FIG. 4 as suggested tag options 408. Suggested tag options 408 may be provided to a user prior to the user entering any text into text box 404. Options 408 may be normalized tags generated in response to the user selecting the specific item. According to one embodiment, options 408 are generated by keyword logic 204. Other techniques, including those discussed with respect to tag logic 112 and base list 202 (see FIG. 2), may also be used to generate options 408.

As shown in FIG. 4, options 408 may be computer-generated icons that include the name of a tag associated with the icon. In order to present a meaningful display to the user, the number of options 408 displayed at any one time may be limited, with additional options 408 being presented to the user upon the user selecting more option 410 ("more"). A user may select (i.e., highlight, click-on, etc.) one of options 408 to tag a specific item, at which time tag logic 112 assigns the selected option 408 to the item. Other methods of displaying options 408 to a user may alternatively be used.

Referring to FIG. 5, an embodiment of providing feedback to a user as a user enters tag information is shown. As shown in FIG. 5, display 500 is similar to display 400 shown in FIG. 4 in that display 500 includes item information 502, text box 504, and add option 506. However, display 500 additionally includes auto-complete options 508. Auto-complete options 508 are displayed using a menu, shown as pull-down menu 510, where a user may scroll through the options and highlight or otherwise select the desired selection. Other alternative methods of displaying auto-complete options 500 to a user may also be used. Options 508 may be tags that contain the string of characters that the user has at that time typed into text box 504. For example, upon a user typing "TA," auto-complete options menu 510 may contain options 508 such as "TAG 1" and "TAG 2." For example, in FIG. 5, text bdx 504 contains the character string "TA," and each of options 508 in menu 510 also contains the character string "TA." According to one embodiment, only tags that are stored in base list 202 are included in menu 510.

Upon identifying an option 508 the user wishes to assign to an item, the user scrolls up or down through menu 510 and selects (e.g., highlights, clicks on, etc.) the desired option 508, at which time tag logic 112 assigns the selected option 508 to the item. Other methods of presenting options 508 to a user may alternatively be used.

Referring to FIG. 6, another embodiment of providing feedback to a user tagging an item is shown. As shown in FIG. 6, display 600 is similar to display 400 in that display 600 includes item information 602, text box 604, and option 606. However, display 600 additionally includes suggested tag options 608. Suggested tag options 608 are generated in response to a user entering tag text into text box 604 and selecting add option 606 ("Add"). In response to the user's choice, tag service 108 generates and displays one or more suggested tag options 608.

Options 608 may be generated by analyzing the text entered into text box 604 in conjunction with the information contained in tag database 110 (including base list 202) and generating feedback (e.g., a set of normalized tags) using any of the techniques or combination of techniques described with respect to tag logic 112 (see FIG. 2). For example, spelling logic 208 may analyze the entered text for spelling or punctuation errors, and suggest corrected tags as part of options 608. Further, stemming logic 212 may determine whether any tags in base list 202 have a common stem or root form with the entered text. Additionally, taxonomy logic 214 may analyze tag database 110 for any taxonomy information relating the entered text to other tags contained in base list 202 and present any such tags as options 608. These and other methods may be used to generate options 608 to display to a user after receiving a tag from the user. Further, the various methods may be used in conjunction with all of the tags stored in database 110, or with those tags stored in base list 202.

According to one embodiment, options 608 may be displayed in the same manner as options 408 (see FIG. 4). As shown in FIG. 6, display 600 further includes replace option 610 ("replace previous tag") and new option 612 ("add as new tag"). Replace option 610 allows a user to choose one of options 608 and then replace the previously entered tag with the selected option 608, such that only the selected option 608 is assigned to the item. Option 612 allows a user to assign option 608 in addition to the previously entered tag. According to another embodiment, display 600 does not include options 610 and 612, and upon a user selecting one of options 608, tag logic 112 automatically replaces the previously entered text with the selected option 608 (e.g., a new tag) as the tag assigned to the particular item.

According to one embodiment, options 608 are only a portion of the total options generated, and display 600 includes choice 614 ("more"). Choice 614 allows a user to receive additional options 608 in addition to those shown in FIG. 6. Such a feature may be helpful when a large number of options 608 would otherwise be displayed at one time to a user, making the suggestions less useful to the user.

The feedback provided to users as users discussed with respect to FIGS. 4-6 may be sorted in various ways, and the number of tags presented to a user at one time may be limited to a predefined or selectable number of options. According to one embodiment, any options that are included in base list 202 are presented to the user first, with the options being subsequently ordered by frequency of usage. According to another embodiment, the options are ordered according to their frequency of usage by a particular user. For example, the options may be sorted according to their frequency of usage for the current user; however, the sorting may also be based on the usage by any identifiable user or group of users. According to yet another embodiment, the options may be ordered alphabetically. The various ordering methodologies disclosed herein may be used in combination or in varying sequence, or in combination with other ordering methods.

Here and throughout, terms such as "web page," "website," and so forth are used to give specific illustrative examples of settings in which on-line content can be presented to and perceived by users. Such examples are not intended to be limiting, and persons of skill in the art will appreciate that many other such settings now known or yet to be developed may be suitable to the practice of the present invention in specific embodiments.

It should be noted that although flowcharts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems, and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An illustrative system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method for assigning a tag to an item, comprising:
    storing information associated with a plurality of tags assigned to a plurality of items in a computer-implemented database;
    generating a base list of normalized tags by applying tag logic to the information stored in the database, tag logic including at least one of keyword logic, frequency logic, spelling logic, synonym logic, and stemming logic;
    receiving a selection of an item to be tagged from a user;
    providing a first set of suggested tag options to the user, the first set of tag options including at least one normalized tag from the base list, the at least one normalized tag from the base list representing a unified form of multiple tags;
    receiving a new tag from the user;
    referencing a taxonomy of tags to determine a tag that is a synonym of the new tag and is a normalized tag representing a unified form of the new tag and at least one other tag;
    providing a second set of suggested tag options to the user based on the received new tag, the second set of tag options including the tag that is the synonym of the new tag and is the normalized tag representing the unified form of the new tag and the at least one other tag;
    receiving, from the user, a selection of the tag that is the synonym of the new tag and is the normalized tag representing the unified form of the new tag and the at least one other tag from the second set of tag options; and
    in response to the receiving of the selection, assigning the selected tag that is the synonym of the new tag and is the normalized tag representing the unified form of the new tag and the at least one other tag to the item.

2. A computer-implemented system for assigning a tag to an item comprising:
    one or more processors;
    a computer-implemented database configured to store a set of tags assigned to the item; and
    tag logic, executable on the one or more processors to:
        receive a first input from a user identifying a first tag;
        reference a taxonomy of tags to determine a tag that is of greater specificity or lesser specificity in the taxonomy than the first tag and is a normalized tag representing a unified form of multiple different tags;
        provide feedback to the user based at least in part upon the first input, the feedback comprising the tag that is of greater specificity or lesser specificity in the taxonomy than the first tag and is the normalized tag representing the unified form of the multiple different tags;

receive a second input from the user based at least in part on the feedback, the second input identifying the tag that is of greater specificity or lesser specificity in the taxonomy than the first tag and is the normalized tag representing the unified form of the multiple different tags; and in response to receiving the second input, assign the tag that is of greater specificity or lesser specificity in the taxonomy than the first tag and is the normalized tag representing the unified form of the multiple different tags to the item.

3. The system of claim 2, wherein the feedback includes a display of an auto-complete option.

4. The system of claim 3, wherein the auto-complete option includes a word having a character string in common with the first input.

5. The system of claim 3, wherein the auto-complete option includes a correction to a spelling error in the first input.

6. The system of claim 3, wherein the tag logic is further configured to:

generate a menu that includes the auto-complete option; and receive a selection of the auto-complete option from the user.

7. The system of claim 6, wherein the auto-complete option is one tag of the set of tags.

8. The system of claim 6, wherein the auto-complete option is a normalized tag.

9. The system of claim 2, wherein the tag logic is further configured to:

generate an input display containing the first input;

detect a spelling error in the first input; and automatically modify the input display responsive to the spelling error in the first input.

10. The system of claim 2, wherein the tag logic is further configured to:

provide additional feedback to the user based at least in part on the tag that is of greater specificity or lesser specificity in the taxonomy than the first tag and is the normalized tag representing the unified form of the multiple different tags.

11. The system of claim 10, wherein the additional feedback includes one tag of the set of tags.

12. The system of claim 11, wherein the additional feedback includes a normalized tag.

13. A computer-implemented method for assigning a tag to an item, the method comprising:

storing a set of tags assigned to an item in a computer-implemented tag database;

receiving a first input from a user identifying a first tag;

referencing a taxonomy of tags to determine a tag that is a synonym of the first tag and is a normalized tag representing a unified form of the first tag and at least one other tag;

providing feedback to the user based at least in part on the first input, the feedback comprising the tag that is the synonym of the first tag and is the normalized tag representing the unified form of the first tag and the at least one other tag;

receiving a second input from the user based at least in part on the feedback, the second input identifying the tag that is the synonym of the first tag and is the normalized tag representing the unified form of the first tag and the at least one other tag; and in response to receiving the second input, assigning the tag that is the synonym of the first tag and is the normalized tag representing the unified form of the first tag and the at least one other tag to the item.

14. The method of claim 13, wherein providing feedback comprises generating a display of an auto-complete option.

15. The method of claim 14, wherein the auto-complete option includes a word having a character string in common with the first input.

16. The method of claim 14, wherein the auto-complete option includes a correction to a spelling error in the first input.

17. The method of claim 14, wherein generating the display of the auto-complete option further comprises:

generating a menu that includes the auto-complete option;

wherein receiving the second input comprises receiving a selection of the auto-complete option via the menu.

18. The method of claim 17, wherein the auto-complete option is one tag of the set of tags.

19. The method of claim 17, wherein the auto-complete option is a normalized tag.

20. The method of claim 13, further comprising:

generating an input display containing the first input;

detecting a spelling error in the first input; and automatically modifying the input display responsive to the spelling error in the first input.

21. The method of claim 13, further comprising:

providing additional feedback to the user based on the tag that is the synonym of the first tag and is the normalized tag representing the unified form of the first tag and the at least one other tag.

22. The method of claim 21, wherein the additional feedback includes one tag of the set of tags.

23. The method of claim 22, wherein the additional feedback includes a normalized tag.

24. The method of claim 21, wherein the database includes taxonomy information linking the tags in the set of tags to each other, and the additional feedback is based on the taxonomy information.

25. A computer-accessible storage medium, the contents of which direct a computing system to:

receive an input from a user, the input relating to a first tag to be assigned to an item;

reference a taxonomy of tags to determine a tag that is of greater specificity or lesser specificity in the taxonomy than the first tag and is a normalized tag representing a unified form of multiple different tags;

generate a display of feedback concerning the first tag in response to the input, the feedback suggesting the tag that is of greater specificity or lesser specificity in the taxonomy than the first tag and is the normalized tag representing the unified form of the multiple different tags;

receive, from the user, a selection of the tag that is of greater specificity or lesser specificity in the taxonomy than the first tag and is the normalized tag representing the unified form of the multiple different tags; and in response to receiving the selection, assign the tag that is of greater specificity or lesser specificity in the taxonomy than the first tag and is the normalized tag representing the unified form of the multiple different tags to the item.

26. The computer-accessible medium of claim 25, wherein the display is a menu generated while receiving the input.

27. The computer-accessible medium of claim 25, wherein the display is a computer-generated icon.

28. The computer-accessible medium of claim 25, wherein the feedback is at least one tag associated with the item prior to receiving the input from the user.

29. The computer-accessible medium of claim 25, wherein the feedback is related to the input via a taxonomy system.

30. A computer-implemented method for providing tag options to a user, comprising:
- storing information regarding tags associated with an item in a computer-implemented database;
- receiving a selection of an item to be tagged;
- providing a first set of suggested tag options to the user based on the item to be tagged, the first set of suggested tag options including a normalized tag generated by applying tag logic to the tags associated with the item, the normalized tag representing a unified form of multiple tags;
- receiving a new tag from the user;
- providing a second set of suggested tag options to the user based at least in part on the new tag, the second set of suggested tag options including at least one tag that is of greater specificity or lesser specificity in a taxonomy of tags than the new tag and is a normalized tag representing a unified form of multiple different tags;
- receiving, from the user, a selection of the tag that is of greater specificity or lesser specificity in the taxonomy than the new tag and is the normalized tag representing the unified form of the multiple different tags based at least in part on the second set of suggested tag options; and
- in response to receiving the selection, assigning the tag that is of greater specificity or lesser specificity in the taxonomy than the new tag and is the normalized tag representing the unified form of the multiple different tags to the item.

31. The method of claim 30, wherein the tags associated with the item are generated using keyword logic to generate a keyword associated with the item; wherein the keyword logic analyzes the text content of the item to generate the keyword.

32. The method of claim 30, wherein providing tag options to the user comprises applying frequency logic to the tags to select a normalized tag based upon the usage of the tags.

33. The method of claim 30, wherein providing tag options to the user comprises using spelling logic to detect a spelling error in at least one of the tags and generate a correction responsive to the spelling error.

34. The method of claim 30, wherein providing tag options to the user comprises applying synonym logic to the plurality of tags, wherein the tag options include a synonym of at least one of the tags.

35. The method of claim 30, wherein providing tag options to the user comprises applying stemming logic to the tags, wherein the tag options are based on the root form of at least one of the tags.

* * * * *